(12) United States Patent
Glawe et al.

(10) Patent No.: US 6,861,127 B2
(45) Date of Patent: Mar. 1, 2005

(54) THERMOFORMABLE MULTI-LAYER FILM

(75) Inventors: Amy Lou Glawe, Downers Grove, IL (US); Adriana Nobre Rubo, São Paulo (BR); Stephen James Vicik, Darien, IL (US)

(73) Assignee: Curwood, Inc., Oshkosh, WI (US)

( * ) Notice: Subject to any disclaimer, the term of this patent is extended or adjusted under 35 U.S.C. 154(b) by 0 days.

(21) Appl. No.: 09/421,605

(22) Filed: Oct. 20, 1999

(65) Prior Publication Data

US 2003/0129434 A1 Jul. 10, 2003

(51) Int. Cl.⁷ .............................................. B32B 27/08
(52) U.S. Cl. ..................... 428/213; 428/214; 428/215; 428/334; 428/337; 428/343; 428/347; 428/349; 428/475.5; 428/475.8; 428/476.1; 428/476.3; 428/476.9
(58) Field of Search ............................... 428/334, 337, 428/343, 347, 349, 515, 516, 213, 214, 215, 475.5, 475.2, 475.8, 476.1, 476.31, 476.9

(56) References Cited

U.S. PATENT DOCUMENTS

| | | | |
|---|---|---|---|
| 3,429,854 A | 2/1969 | Siggel et al. .................. 260/75 |
| 3,966,045 A | 6/1976 | Perdue ........................ 206/443 |
| 4,185,831 A | 1/1980 | Tominaga ............... 273/235 R |
| 4,335,175 A | * 6/1982 | Webb .......................... 428/213 |
| 4,541,983 A | 9/1985 | Hsu et al. .................... 264/514 |
| 4,734,327 A | 3/1988 | Vicik .......................... 428/332 |
| 4,735,855 A | 4/1988 | Wofford et al. ............. 428/349 |
| 4,847,148 A | 7/1989 | Schirmer ..................... 428/332 |
| 4,851,290 A | 7/1989 | Vicik .......................... 428/334 |
| 4,853,287 A | 8/1989 | Schirmer ..................... 428/349 |
| 4,857,408 A | 8/1989 | Vicik .......................... 428/474.4 |
| 4,859,514 A | * 8/1989 | Friedrich et al. ........... 428/36.6 |
| 4,911,963 A | 3/1990 | Lustig et al. ............. 428/36.91 |
| 4,935,089 A | 6/1990 | Schirmer ................... 156/272.6 |
| 5,011,735 A | 4/1991 | Schirmer .................... 428/349 |
| 5,053,259 A | 10/1991 | Vicik ...................... 428/36.91 |
| 5,183,706 A | * 2/1993 | Bekele ........................ 428/349 |
| 5,283,128 A | 2/1994 | Wilhoit ....................... 428/516 |
| 5,382,470 A | 1/1995 | Vicik .......................... 428/334 |
| 5,403,668 A | * 4/1995 | Wilhoit ....................... 428/500 |
| 5,491,009 A | * 2/1996 | Bekele ....................... 428/35.7 |
| 5,593,747 A | * 1/1997 | Georgelos .................. 428/36.7 |
| 5,658,625 A | 8/1997 | Bradfute et al. ........... 428/34.9 |
| 5,928,740 A | * 7/1999 | Wilhoit et al. ............. 428/34.9 |
| 6,068,933 A | * 5/2000 | Shepard et al. .......... 428/474.4 |
| 6,106,935 A | * 8/2000 | Lambert et al. ............ 428/220 |

OTHER PUBLICATIONS

Product Information Sheet—Byunel® CXA Series 3000 dated Jan. 23, 2003.
Procuct Information Sheet, Dupont Bynel®, dated Jan. 10, 2002.
Product Information Sheet, Dow Plastics Affinity PL 1880, dated Jul. 2001.
Product Information Sheet, Dupont Surlyn® 1650, dated Dec. 13, 2001.
Product Information Sheet, Dupont Selar® PA 3426 dated Dec. 13, 2001.
Product Information Sheet, Dupont Selar® PA 3426, dated Dec. 13, 2001.
Product Information Sheet, Dupont Surlyn® 1601, dated Jul. 2000.

* cited by examiner

*Primary Examiner*—Monique R. Jackson
(74) *Attorney, Agent, or Firm*—Brinks Hofer Gilson & Lione

(57) ABSTRACT

Thermoformable plastic films can be formed into bags, pouches, trays, etc. which are useful when packaging foodstuffs and other products. These films enjoy widespread use in the packaging of meat and other oxygen sensitive products due to the gas permeation barrier provided. Thermoformable packaging films comprise one or more layers of thermoplastic, including olefinic copolymers, amorphous and crystalline nylons, ionomeric polymers, and polyolefins. By selecting the type and combination order of thermoplastics, a packaging film was developed that provides excellent impact and abrasion resistance, sealability, thermoformability, and optical clarity.

35 Claims, 1 Drawing Sheet

THERMOFORMABLE MULTI-LAYER FILM

BACKGROUND OF THE INVENTION

The present invention relates to a novel, thermoformable multi-layer film useful in goods packaging, especially foodstuffs. The present invention more particularly relates to thermoplastic multi-layer films having good formability during deep-draw thermoforming and resistance to abrasion, puncture, and impact, especially at low temperatures.

It is common practice to package articles, such as food products, in thermoplastic films to protect the product from abrasion and contamination. Thermoplastics also provide a convenient and durable package for further processing, transportation, and ultimate sale to an end user. Current marketing and distribution practices in the sale of foodstuffs, particularly meat products, have put an increasing demand on the packaging materials to provide needed shelf life.

Thermoformable plastic films with low oxygen transmission rates are especially useful when packaging oxygen-sensitive products including meats. Color retention of the product and extended shelf life are advantageous features of low oxygen permeability. It is also desirable to provide a packaging material that, after the thermoforming operation, will maintain a tight package appearance.

Special problems arise when large amounts of food, such as three kilograms of frankfurters, are packaged in a thermoformed film. Bulky or heavy foodstuffs exert greater stresses upon the packaging film than the smaller packages common in the consumer market, especially if the package is dropped. Problems also arise with the use of in-line chillers following package closure because these chillers subject the packaged product to repeated impact and abrasion.

Packaging films fail when oxygen enters the package due to a hole in the packaging film. Such a hole may arise in numerous ways including sealing failure, puncture, abrasion, or rupture. In the current application, the combination of product bulk, weight, cooling to 0° C., impact, and abrasion resulted in an extremely high incidence of film failure in traditional films. In many instances, the hole is too small to be observed by the naked eye and is only apparent when the package no longer tightly fits the product because of air leakage or when the package is opened by the consumer to reveal spoiled product.

During the sealing of three-kilogram frankfurter packages using available films only 2% to 5% of the packages appeared to have failed during the sealing process. Within 24 hours of sealing, however, 10% to 15% of the packages had failed. When the packages reached the consumer, 40% to 50% of the packages had failed. This high failure rate of commercially available thermoforming films prompted development of the current invention.

BRIEF SUMMARY OF THE INVENTION

A multi-layer thermoformable plastic film comprising a outer layer comprising a blend of a very low density polyolefin, ethylene vinyl acetate, and a compatibilizer; an intermediate layer comprising a mixture of nylon copolymer and an amorphous nylon; a inner layer comprising a polyolefin or ionomeric polymer; and at least one adhesive that bonds said outer, intermediate, and inner layers together.

DETAILED DESCRIPTION OF THE INVENTION

Definitions

Figure 1:
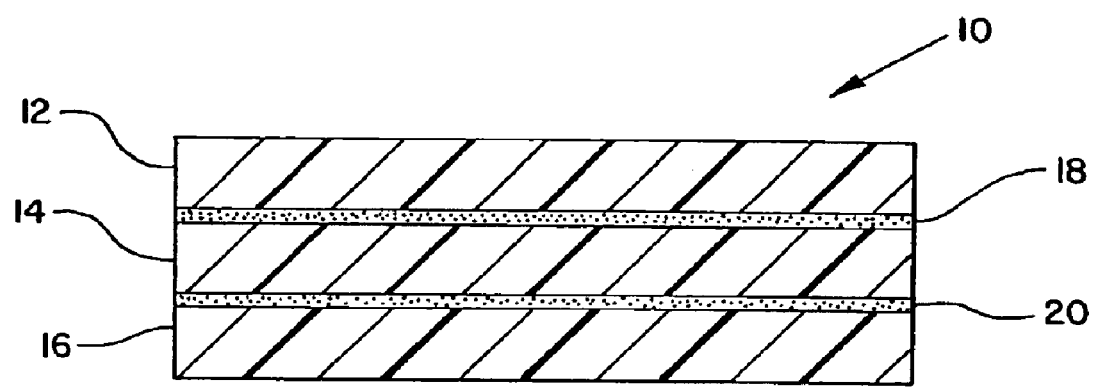
FIG. 1 shows a cross-sectional view of the multi-layered thermoplastic film.

Amorphous Nylon: a nylon having no measurable melting point as measured by differential scanning calorimetry (DSC) using ASTM 3417-83.

Very Low Density (VLD): ethylene α-olefin copolymer having a density between 0.900 and 0.915.

Multi-Layer Thermoformable Film According to Invention

The present invention relates to packaging materials, and more particularly a packaging material useful in the packaging of items, including foodstuffs and other oxygen-sensitive products, that encounter freezing temperatures, abrasion, or impact after packaging. The current multi-layer thermoformable film is useful in forming processes, such as vacuum skin packaging or thermoforming, where a package is formed and sealed. Good heat sealability of the thermoform and closing films, in addition to optical clarity and suitable oxygen-barrier performance, is provided. After sealing, the package resists leakage after cooling to 0° C. and encountering abrasion and impact.

The current invention is particularly useful in packaging meat using an automatic deep-draw apparatus such as that typically described in U.S. Pat. No. 3,491,504 to Young et al., U.S. Pat. No. 3,694,991 to Perdue et al., and U.S. Pat. No. 3,636,678 to Moris et al. Radius plates may be incorporated into the bottom of the deep-draw mold to provide a more even polymer distribution in the thermoform corners.

Utility of Inventive Films

Thermoforming and other similar techniques are well known in the art for packaging food products. A description of typical thermoforming techniques appears in *Modern Plastics Encyclopedia*, 1984–1985, at pages 329–336. Suitable thermoforming methods include standard, deep-draw, or plug-assist vacuum forming. During vacuum forming, the thermoplastic film is heated and a vacuum is applied beneath the film allowing atmospheric pressure to force the film into a preformed mold. When relatively deep molds are employed, the process is referred to as a "deep-draw" application. In a plug-assist vacuum forming method, after the thermoplastic has been heated and sealed across a mold cavity, a plug shape similar to the mold shape impinges on the plastic film and, upon the application of vacuum, the film transfers to the mold surface.

After the thermoformed film, or thermoform, is in place, a product is placed on the thermoform and a second closing film is draped over the product. The package is evacuated and sealed with a device such as a heated jaw. The thermoform encloses a substantial portion, generally more than half, of the product to be packaged. The closing film remains mostly flat atop the product and may display product labeling consisting of colored type, pictures, etc.

The current application employs a thermoformable film that is deep-drawn resulting in a thermoform. After being filled with a food product, the thermoform is bonded to a closing film containing the same sealing component composition as the thermoform.

Vacuum skin packaging (VSP) is another process well known in the art that uses a thermoplastic packaging material to enclose a product. Various apparatus and processes are described in U.S. Pat. Nos. 3,835,618, 3,950,919, and Reissue 30,009, all issued to Perdue. The vacuum skin packaging process is in one sense a type of thermoforming process in which an article to be packaged serves as the mold for the thermoform. An article may be placed on a support member, a card, either rigid or semi-rigid, or other bottom, and the supported article is then passed to a chamber where a top film is drawn upward against a heated dome and then draped over the article. The movement of the plastic top film is controlled by vacuum and or air pressure, and in a vacuum skin packaging arrangement, the interior of the container is evacuated before final sealing of the top film to the support. Thermoformable material may be used as both the top film and bottom support in conjunction with an intermediate support for products held on either side of the support as shown for example in U.S. Pat. No. 3,966,045.

Outer Layer

Outer layer 12 comprises a material that can be thermoformed. Outer layer 12 should be a material that provides abrasion, puncture, and impact resistance, especially at or near 0° C. Outer layer 12 is a blend of very low-density polyolefin, ethylene vinyl acetate, a compatibilizer, and optionally a processing aid.

The blend typically comprises about 30% to 50%, preferably about 40% to 47%, most preferably about 44%, of a very low density polyolefin, based on the total weight of outer layer 12. Preferably, the very low-density polyolefin is a very low-density polyethylene (VLDPE). Most preferably, the VLDPE is XU 61520.01 ethylene-octene copolymer, obtained from DOW, Midland, Mich.

The blend typically comprises about 30% to 45%, preferably about 35% to 40%, most preferably about 36%, of a ethylene vinyl acetate, based on the total weight of outer layer 12. Preferably, ethylene vinyl acetate, sold as LD 701.06 by Exxon, Houston, Tex. Other sources of ethylene vinyl acetate or similar polymers are available and can also be used, including ELVAX resin, DuPont deNemours, Wilmington, Del. and EVATANE, made by Elf Atochem in France.

The blend typically comprises about 10% to 25%, preferably about 15% to 20%, most preferably about 15%, of a compatibilizer, based on the total weight of outer layer 12. The compatibilizer prevents the very low-density polyolefin and ethylene vinyl acetate from hazing, thereby ensuring good optics, such as gloss and clarity, for the packaging film. Preferably, the compatibilizer is ethylene α-olefin having a density less than 0.900 and a melting point range of about 56–75° C. Most preferably, the compatibilizer is Tafmer 1085, which is available from Mitsui, Japan. Other sources of ethylene α-olefin or similar compatibilizers are available and can also be used, including SLX9110 and EXACT 4053 from Exxon in Texas.

The blend typically comprises about 200 to 2000 ppm, preferably about 1200 ppm, of a processing aid, based on the total weight of outer layer 12. The processing aid assists during extrusion to allow smooth polymer flow and uniform thickness of the various polymer layers in the multi-layered thermoplastic film. Preferably, the processing aid is a fluroelastomer. A suitable fluroelastomer can be obtained from Dyneon in Minnesota. Other sources of fluroelastomers or similar process aids are available and can also be used, including products from DuPont.

The blend which forms the outer layer 12 of the multi-layer thermoformable film, is created by combining the above components prior to formation of the film. The outer layer 12 typically has a thickness of about 45 μm to 75 μm, preferably about 55 μm to 63 μm, most preferably about 55 μm.

Although many patents referencing multi-layer thermoformable films are described in the literature, the added "toughness" imparted by the special VLDPE blend of the current invention makes the disclosed film uniquely suited to low-temperature and other high-stress packaging operations. The increased puncture, impact, and abrasion resistance of outer layer 12 provides a significant benefit.

Intermediate Layer

Intermediate layer 14 is a polyamide mixture with "low" crystallinity that provides the multi-layer thermoformable film with the desired thermoformability characteristics including good corner thickness uniformity, even when using a deep-draw mold. Intermediate layer 14 also provides the current multi-layer thermoformable film with oxygen-barrier characteristics. Intermediate layer 14 is typically a mixture of nylon copolymer and amorphous nylon.

The layer typically comprises about 75% to 92%, most preferably about 80% of nylon 6,66 based on the total weight of intermediate layer 14. The layer typically comprises about 8% to 25%, most preferably about 20% of amorphous nylon based on the total weight of intermediate layer 14. Most preferably, nylon 6,66 sold as CAPRON 1539F from Allied Signal in Morristown, N.J. Other sources of nylon 6,66 or similar polymers are available and can also be used, including CAPRON CA73YP, CA73WP, CA73QP and CAPRON CR95WP from Allied Signal. Also included is ULTRAMID C35 from BASF in Germany. Most preferably, the amorphous nylon sold as SELAR PA 3426 from DuPont in Wilmington, Del. Other sources of amorphous nylon or similar polymers are available and can also be used, including GRIVORY G21 from EMS in Switzerland and NORAMID X21 from Mitsubishi in Japan.

The nylon 6,66 is typically an 85/15 copolymer with the 85 being the nylon 6 component having a melting point between about 195° and 200° C. The intermediate layer 14 typically has a thickness of about 45 μm to 75 μm, preferably of about 55 μm to 63 μm, most preferably of about 55 μm.

Intermediate layer 14 provides the benefit of increased corner thickness by allowing the multi-layer thermoformable film to evenly distribute, but not thin out, in the corners during thermoforming. Intermediate layer 14 also provides the oxygen barrier qualities necessary for an approximate 180-day shelf life in a refrigerated display case.

The current multi-layer thermoformable film allows less than 1 cc of oxygen to pass through 100 in.$^2$ of packaging film over a 24-hour period when exposed to one atmosphere of differential pressure. Packaging films that pass less than 1 cc of oxygen under these conditions are generally accepted to provide the requisite 180-day product shelf life.

Inner Layer

Inner layer 16, which is the sealing layer, comprises a material that can be thermoformed. Inner layer 16 should be a material that provides an integral, leak-proof package when sealed. Inner layer 16 is typically a polyolefin or ionomer. In the current application, ionomers were found to provide a superior seal, especially in the presence of grease.

Inner layer 16 typically comprises AFFINITY DL 1880, obtained from Dow Plastics, Midland, Mich. or Surlyn 1601, or most preferably SURLYN 1650 obtained from DuPont, Wilmington, Del. Other sources of polyolefins or similar polymers are available and can also be used, including EVA's which can be obtained from Exxon, DuPont or Elf Atochem.

Inner layer 16 typically has a thickness of greater than about 37 μm, most preferably about 45 μm.

Adhesive Layer

Bonding interfaces 18 and 20 can be any adhesive compatible with layers 12, 14, and 16, preferably an anhydride modified polyolefin or polyolefin copolymer. Most preferably BYNEL 3095, which is available from Du Pont. Other sources of similar adhesives are available and can also be used, including adhesives from DuPont, Dow, Rohm & Haas and Mitsui.

The bonding interfaces 18 and 20 typically have a thickness of about 5 $\mu$m to 25 $\mu$m, preferably about 10 $\mu$m to 20 $\mu$m, most preferably about 15 $\mu$m.

Forming the Multi-Layered Thermoplastic Film

Blown and cast film coextrusion processes well known in the art may be utilized to produce the current multi-layer thermoformable film. Conventional lamination techniques are also appropriate.

The current five-layer film produces a uniform gauge preform (thermoformed container) with excellent sealability and good optical qualities. Thermoforming conditions should be adjusted via normal practice to produce a uniform gauge in the preform corners. Total multi-layer thermoformable film thickness should be about 150 to 210 $\mu$m, preferably about 165 to 195 $\mu$m, most preferably about 180 $\mu$m.

EXAMPLES

The following examples are provided to exemplify, but not limit, the scope of the multi-layer thermoformable film.

Example 1

Table I describes one preferred embodiment of the present invention, including polymer constituents and corresponding thickness for each layer of the multi-layer thermoformable film.

TABLE I

| Outer (12) | Bonding (18) | Intermediate (14) | Bonding (20) | Inner (16) |
|---|---|---|---|---|
| VLDPE Blend | Bynel 3095 | Nylon Mixture | Bynel 3095 | Surlyn 1650 |
| 55 $\mu$m | 15 $\mu$m | 50 $\mu$m | 15 $\mu$m | 45 $\mu$m |

Referring to FIG. 1, current multi-layered thermoplastic film 10 comprises a outer layer 12, an intermediate layer 14, and a inner layer 16. These layers are bonded together at interfaces 18 and 20 by an adhesive compatible with the layers.

Example 2

When developing the inventive multi-layer thermoformable film, expensive thermoforming trials were minimized by a laboratory developed "creep test" to mimic thermoformability performance of different plastic packaging films. The creep test is conducted by taking the film and cutting out a strip measuring 1×10 inches. It doesn't appear that the orientation (machine direction or transverse direction) is critical because the film is not highly oriented. In the middle of the strip, two lines are drawn 5 inches apart. The film is suspended by clamping a portion of the film above one of the lines. Then a 187 $\mu$m weight is clamped to the lower end of the film below the second of the lines. After 5 min. at 160° F., the distance between the two lines is measured. If the elongation is less than 0.5 inches, the creep is considered "low." If the elongation is greater than 0.75 inches, the creep is considered "high." For purposes of the invention, a higher creep is better. Prior to thermoforming, crystallinity measurements were recorded for the hot-blown films using differential scanning calorimetry to predict thermoformability. Puncture resistance was simulated by measuring the force in Kg/Cm required to puncture the film.

The superior performance of the invention in relation to commercially available films was demonstrated with a production-line trial. Multiple combinations of film layers, including the multi-layer thermoformable film of the current invention, were coextruded and thermoformed with a R7000 thermoformer manufactured by Multivac of Kansas City.

Three kilograms of frankfurters were loaded into the resultant thermoforms and a closing film was sealed in place. A mechanical chiller employing a 0° C. brine solution followed the sealing process. After passing through the chiller, the chilled packages dropped onto a conveyor and then into boxes.

The actual percentage of holes which resulted in the frankfurter packages after chilling and impact with the conveyor was determined by inserting a pressurized air line into the packages while the packages were submerged in water. These tests demonstrated that for the current deep-draw operation a corner film thickness of greater than about 25 $\mu$m was required to ensure that the packaging film would not fail after abrasion in the chiller and impact from the fall to the conveyor. The production-line trial results are shown below in Table II.

TABLE II

| Plastic Film Type | % Holes In Film After Chilling at 0° C. | Thermoforming (DSC) J/g | Puncture (Kg–Cm) |
|---|---|---|---|
| Current Film | 3.23 | 8 | 16 |
| Film A | 8.78 | 18 | 13 |
| Film B | 6.32 | 18 | 18 |
| Film C | 5.57 | 14 | 13 |

One embodiment of the invention is the multi-layer thermoformable film represented in Table I. Other films tested, represented as A through C in Table II, consisted of the following component layers:

Film A: Nylon/Adhesive/PE/Adhesive/Ionomer;

Film B: VLDPE/Adhesive/Nylon/Adhesive/Ionomer; and

Film C: Nylon/Adhesive/VLDPE/Adhesive/Ionomer. The embodiment represented in Table I lowered package failure rates to 3.23% during the large-scale production run.

We claim:

1. A multi-layer thermoformable plastic film comprising:
   an outer layer comprising a blend of a very low density polyethylene, ethylene vinyl acetate, and a compatibilizer, wherein said very low density polyethylene is an ethylene α-olefin copolymer having a density between 0.900 and 0.915 g/cm$^3$ and said compatibilizer is an ethylene α-olefin copolymer having a density less than 0.900 g/cm$^3$;
   an intermediate layer comprising a mixture of nylon 6,66 copolymer and an amorphous nylon;
   an inner heat sealing layer comprising a polyolefin or ionomeric polymer; and
   at least one adhesive that bonds said outer, intermediate, and inner layers together.

2. The multi-layer thermoformable film of claim 1, wherein the outer layer comprises a blend of:
   about 30% to 50% by weight very low density polyethylene, based on the total weight of the outer layer;
   about 30% to 45% by weight ethylene vinyl acetate, based on the total weight of the outer layer; and about 10% to 24% by weight of a compatibilizer, based on the total weight of the outer layer.

3. The multi-layer thermoformable film of claim 1, wherein the outer layer comprises a blend of:
about 44% by weight very low density polyethylene, based on the total weight of the outer layer;
about 36% by weight ethylene vinyl acetate, based on the total weight of the outer layer; and
about 15% by weight of a compatibilizer, based on the total weight of the outer layer.

4. The multi-layer thermoformable film of claim 1, wherein said compatibilizer is an ethylene α-olefin copolymer having a density less than 0.900 g/cm$^3$ with a melting point range of 55–75° C.

5. The multi-layer thermoformable film of claim 1, wherein said compatibilizer is a plastomer-type ethylene α-olefin copolymer having a density of 0.88 g/cm$^3$, a melt index of 1.4 (g/10 min), and a melting point of 71° C.

6. The multi-layer thermoformable film of claim 1, wherein the outer layer has a thickness of about 45 μm to 75 μm.

7. The multi-layer thermoformable film of claim 1, wherein the outer layer has a thickness of about 52 μm to 63 μm.

8. The multi-layer thermoformable film of claim 1, wherein the outer layer has a thickness of about 55 μm.

9. The multi-layer thermoformable film of claim 1, further comprising a processing aid.

10. The multi-layer thermoformable film of claim 9, wherein the processing aid comprises a fluroelastomer.

11. The multi-layer thermoformable film of claim 9, wherein the outer layer comprises about 200 to 2000 ppm of a processing aid.

12. The multi-layer thermoformable film of claim 11, wherein the outer layer comprises about 1200 ppm of a processing aid.

13. The multi-layer thermoformable film of claim 1, wherein the intermediate layer comprises:
about 75% to 92% by weight of nylon 6,66 based on the total weight of the intermediate layer; and
about 8% to 25% by weight of amorphous nylon, based on the total weight of the intermediate layer.

14. The multi-layer thermoformable film of claim 1, wherein the intermediate layer comprises:
about 80% by weight of nylon 6,66, based on the total weight of the intermediate layer; and
about 20% by weight of amorphous nylon, based on the total weight of the intermediate layer.

15. The multi-layer thermoformable film of claim 1, wherein nylon 6,66 is an 85/15 copolymer with the 85 being the nylon 6 component and having a Differential Scanning Calorimeter melting point of 195–200 C.

16. The multi-layer thermoformable film of claim 1, wherein the amorphous nylon is a nylon having no measurable melting point as measured by Differential Scanning Calorimeter using ASTM 3417-83.

17. The amorphous nylon of claim 1, wherein the amorphous nylon is a polyamide 6I/6T resin having a density of 119 kg/m$^3$ and a glass transition temperature of 127° C.

18. The multi-layer thermoformable film of claim 1, wherein the intermediate layer has a thickness of about 40 μm to 60 μm.

19. The multi-layer thermoformable film of claim 1, wherein the intermediate layer has a thickness of about 45 μm to 55 μm.

20. The multi-layer thermoformable film of claim 1, wherein the intermediate layer has a thickness of about 50 μm.

21. The multi-layer thermoformable film of claim 1, wherein the inner layer comprises a zinc ionomer.

22. The multi-layer thermoformable film of claim 1, wherein the inner layer comprises a zinc salt of an ethylene/organic acid copolymer (zinc ionomer) having a melt index of 1.5 to 1.6 dg/min and a melting point of 94–97° C.

23. The multi-layer thermoformable film of claim 1, wherein the inner layer comprises a sodium ionomer.

24. The multi-layer thermoformable film of claim 1, wherein the inner layer comprises a sodium salt of an ethylene/organic acid copolymer (sodium ionomer) having a melt index of 1.3 dg/min and a melting point of 98° C.

25. The multi-layer thermoformable film of claim 1, wherein the inner layer comprises a metallocene catalyzed ethylene-olefin copolymer.

26. The multi-layer thermoformable film of claim 1, wherein the inner layer comprises an ethylene α-olefin resin having a density of 0.902 g/cc, a melting point of 99 to 100° C., and a melt index of 1.0 g/10 min.

27. The multi-layer thermoformable film of claim 1, wherein the inner layer has a thickness of greater than 37 μm.

28. The multi-layer thermoformable film of claim 1, wherein the inner layer has a thickness of about 45 μm.

29. The multi-layer thermoformable film of claim 1, wherein at least one adhesive comprises anhydride modified polyolefin or polyolefin copolymer.

30. The multi-layer thermoformable film of claim 1, wherein the at least one adhesive comprises an anhydride-modified ethylene vinyl acetate resin having a density of 0.925 g/cm$^3$, a melt index of 2.3 dg/min, and a melting point of 102° C.

31. The multi-layer thermoformable film of claim 1, wherein the at least one adhesive forms bonding interfaces between the outer layer and the intermediate layer, and between the intermediate layer and the inner layer, wherein said bonding interfaces have a thickness of about 5 μm to 25 μm.

32. The multi-layer thermoformable film of claim 1, wherein the at least one adhesive forms bonding interfaces between the outer layer and the intermediate layer, and between the intermediate layer and the inner layer, wherein said bonding interfaces have a thickness of about 10 μm to 20 μm.

33. The multi-layer thermoformable film of claim 1, wherein the at least one adhesive forms bonding interfaces between the outer layer and the intermediate layer, and between the intermediate layer and the inner layer, wherein said bonding interfaces have a thickness of about 15 μm.

34. The multi-layer thermoformable film of claim 1, in combination with a closing film, where the closing film is in contact with and heat sealed to the inner layer of the multi-layer thermoformable film.

35. The multi-layer thermoformable film of claim 34, where the inner layer of the multi-layer thermoformable film is in contact with a foodstuff.

* * * * *